United States Patent [19]

Akiyama et al.

[11] Patent Number: 5,296,540
[45] Date of Patent: Mar. 22, 1994

[54] SHAPED RESIN ARTICLE COMPRISING POLYPHENYLENE ETHER

[75] Inventors: Yoshikuni Akiyama, Kurashiki; Ken Mizushiro, Fuchu, both of Japan

[73] Assignee: Asahi Kasei Kogyo Kabushiki Kaisha, Osaka, Japan

[21] Appl. No.: 982,124

[22] Filed: Nov. 25, 1992

Related U.S. Application Data

[63] Continuation of Ser. No. 476,436, May 25, 1990, abandoned.

[30] Foreign Application Priority Data

Oct. 6, 1989 [JP] Japan .................. 1-260072
Nov. 15, 1989 [JP] Japan .................. 1-294953

[51] Int. Cl.$^5$ .................. C08L 53/02; C08L 71/12; C08F 283/08
[52] U.S. Cl. .................. 525/88; 525/92; 525/98; 525/133; 525/392; 525/905; 524/505; 524/508
[58] Field of Search .................. 525/88, 98, 92, 133, 525/392, 905; 524/505, 508

[56] References Cited

U.S. PATENT DOCUMENTS

| | | | |
|---|---|---|---|
| 3,361,851 | 1/1968 | Gowan | 260/807 |
| 3,994,856 | 11/1976 | Katchman | 260/42.47 |
| 4,128,602 | 12/1978 | Katchman et al. | 525/133 |
| 4,145,377 | 3/1979 | Bussink | 360/876 |
| 4,166,055 | 8/1979 | Lee, Jr. | 260/30.6 |
| 4,239,673 | 12/1980 | Lee, Jr. | 260/30.6 |
| 4,242,263 | 12/1980 | Lee, Jr. | 260/306 |
| 4,383,082 | 5/1983 | Lee, Jr. | 525/92 |
| 4,528,327 | 7/1985 | Cooper | 525/68 |
| 4,584,334 | 4/1986 | Lee, Jr. et al. | 524/151 |
| 4,617,346 | 10/1986 | Sonoda | 525/68 |
| 4,772,657 | 9/1988 | Akiyama et al. | 524/504 |
| 4,782,108 | 11/1988 | Yano et al. | 525/133 |
| 4,863,997 | 9/1989 | Shibuya et al. | 525/92 |
| 5,059,645 | 10/1991 | Ostermeyer et al. | 525/92 |

FOREIGN PATENT DOCUMENTS

| | | |
|---|---|---|
| 0080666 | 6/1983 | European Pat. Off. . |
| 0115712 | 8/1984 | European Pat. Off. . |
| 0133487 | 2/1985 | European Pat. Off. . |
| 0263678 | 4/1988 | European Pat. Off. . |
| 0274029 | 7/1988 | European Pat. Off. . |
| 0326895 | 8/1989 | European Pat. Off. . |
| 0329423 | 8/1989 | European Pat. Off. . |
| 63-218748 | 9/1988 | Japan . |
| 63-245453 | 10/1988 | Japan . |
| 64-40556 | 2/1989 | Japan . |
| 1-98647 | 4/1989 | Japan . |
| 1-204939 | 8/1989 | Japan . |
| 1-221444 | 9/1989 | Japan . |

*Primary Examiner*—Paul R. Michl
*Assistant Examiner*—Tae H. Yoon
*Attorney, Agent, or Firm*—Armstrong, Westerman, Hattori, McLeland & Naughton

[57] ABSTRACT

Disclosed is a shaped resin article comprising (1) a continuous phase of a polyphenylene ether and (2) a dispersed phase dispersed in the continuous phase (1). The dispersed phase comprises (a) a particulate dispersed polyolefin phase which is comprised of a polyolefin and has a minor diameter of not greater than 0.5 μm, the outer surface of the dispersed polyolefin phase (a) having, cohered thereto, particles of at least one copolymer selected from the group consisting of a copolymer of a vinyl aromatic compound and a conjugated diene compound and a hydrogenation product thereof, and (b) a particulate dispersed copolymer phase having a minor diameter of not greater than 0.3 μm, which is comprised of at least one copolymer selected from the above-mentioned group and is dispersed in the continuous phase (1) and not cohered to the dispersed polyolefin phase (a). The shaped resin article has not only remarkably improved weld-line toughness and delamination resistance but also excellent resistance to heat, impact and chemicals.

6 Claims, 2 Drawing Sheets

0.25 μm 0.25 μm

SHAPED RESIN ARTICLE COMPRISING POLYPHENYLENE ETHER

This application is a continuation of application Ser. No. 07/476,436 filed May 25, 1990 now abandoned.

TECHNICAL FIELD

The present invention relates to a shaped resin article. More particularly, the present invention is concerned with a shaped resin article comprising a continuous phase of a polyphenylene ether and a dispersed phase dispersed in the continuous phase and comprising a particulate dispersed polyolefin phase, the outer surface thereof having particles of at least one specific copolymer cohered thereto, and a particulate dispersed copolymer phase.

The shaped resin article of the present invention has excellent weld-line toughness and excellent resistance to delamination, heat, impact and chemicals. Accordingly, the shaped resin article of the present invention can advantageously be utilized for various electrical and electronic components, automobile parts and other engineering materials.

BACKGROUND ART

Polyphenylene ethers have excellent transparency, mechanical and electrical properties, heat resistance and dimensional stability as well as advantageously low moisture absorption. However, polyphenylene ethers have poor moldability and poor impact strength.

To obviate the drawbacks of poor moldability and poor impact strength, it has been attempted to blend a polyphenylene ether with a polystyrene or a high impact polystyrene. Compositions comprising a polyphenylene ether and a polystyrene or a high impact polystyrene are now widely used to manufacture electrical and electronic components, housings for business machines, automobile parts, precision components and other engineering materials. With respect to such classical polyphenylene ether resin compositions comprising a polyphenylene ether and a high impact polystyrene, reference is made to, for example, U.S. Pat. No. 3,383,435. Such polyphenylene ether resin compositions exhibit improved impact strength. However, they have poor chemical resistance.

Proposals for improving both of impact strength and chemical resistance, especially solvent resistance, by blending a polyphenylene ether with a polyolefin have been made, for which reference is made to, for example, U.S. Pat. No. 3,361,851 and Japanese Examined Patent Application Publication Specification No. 42-7069/1967. Compositions comprising a polyphenylene ether and a polyolefin suffer from severe delamination so that the actual application of the compositions is extremely limited.

In the art, other various proposals have also been made. U.S. Pat. No.3,994,856 discloses a composition obtained by blending a polyphenylene ether or a combination of a polyphenylene ether and a polystyrene resin with a hydrogenated block copolymer, which composition is described as exhibiting improved impact resistance and solvent resistance. Further, U.S. Pat. No. 4,145,377 discloses a composition comprising a polyphenylene ether or a combination of a polyphenylene ether resin and a polystyrene resin, a preliminary blend of a polyolefin and a hydrogenated block copolymer in weight proportions of 20-80: 80-20, and a hydrogenated block copolymer, which composition is described as exhibiting improved impact resistance and solvent resistance. Still further, U.S. Pat. Nos. 4,166,055; 4,239,673 and 4,242,263, disclose compositions obtained by blending a polyphenylene ether with a block copolymer or with a combination of a hydrogenated block copolymer and a polyolefin, which compositions are described as having improved impact resistance. Still further, U.S. Pat. No. 4,383,082, European Patent Publication No. 115,712 and Dutch Patent No. 7,410,861 disclose compositions obtained by blending a polyphenylene ether with a polyolefin and a hydrogenated bock copolymer, which compositions are described as having improved impact resistance. Still further, U.S. Pat. No. 4,863,997 and Japanese Patent Application Laid-Open Specifications Nos. 63-113058/1988; 63-225642/1988; 64-98647/1989; 64-204939/1989 and 64-221444/1989 disclose compositions obtained by adding a specific hydrogenated block copolymer to a blend comprising a polyolefin resin and a polyphenylene ether resin, which compositions are described as having improved chemical resistance and moldability. Still further, Japanese Patent Application Laid-Open Specification Nos. 63-218748/1988; 63-245453/1988 and 64-40556/1989 disclose compositions obtained by melt kneading a precompound comprising a specific block copolymer and a polyolefin with a polyphenylene ether, which compositions are described as having improved chemical resistance and moldability. The above-mentioned various polyphenylene ether resin compositions exhibit improved solvent resistance and impact resistance as compared to the conventional polyphenylene ether resin composition comprising a polyphenylene ether and polystyrene or a high impact polystyrene. However, they have inherent problems which limit their applications. In particular, conventional compositions comprising at least 50% by weight of a polyphenylene ether and up to 20% by weight of a polyolefin result in a shaped article which exhibits severe delamination and poor weld-line toughness. Such compositions cannot cope with an increasing demand for higher quality in the art with respect to engineering plastics.

DISCLOSURE OF THE INVENTION

The present inventors have made extensive and intensive studies with respect to shaped resin articles comprising a polyphenylene ether, a polyolefin and a compatibility agent. As a result, it has been found that a shaped resin article having not only remarkably improved weld-line toughness and delamination resistance but also excellent resistance to heat, impact and chemicals under the application of stress can be obtained by attaining specific morphology of dispersion with respect to the polyolefin and the compatibility agent. Based on this unexpected finding, the present invention has been completed.

It is, therefore, an object of the present invention to provide a shaped resin article comprising a polyphenylene ether, a polyolefin and a compatibility agent, which is free from the drawbacks of the prior art and has not only remarkably improved weld-line toughness and delamination resistance but also excellent resistance to heat, impact and chemicals.

The foregoing and other objects, features and advantages of the present invention will be apparent from the following detailed description and appended claims.

According to the present invention, there is provided a shaped resin article comprising (1) a continuous phase of a polyphenylene ether and (2) a dispersed phase dispersed in the continuous phase (1). The dispersed phase comprises (α) a particulate dispersed polyolefin phase which is comprised of a polyolefin and has a minor diameter of not greater than 0.5 μm, the outer surface of the dispersed polyolefin phase (α) having, cohered thereto, particles of at least one copolymer selected from the group consisting of a copolymer of a vinyl aromatic compound and a conjugated diene compound and a hydrogenation product thereof, and (β) a particulate dispersed copolymer phase having a minor diameter of not greater than 0.3 μm, which is comprised of at least one copolymer selected from the above-mentioned group and is dispersed in the continuous phase (1) and not cohered to the dispersed polyolefin phase (α).

The polyphenylene ether (hereinafter frequently referred to simply as "PPE") used for forming the continuous phase in the present invention is a homopolymer or a copolymer having recurring units of the formula:

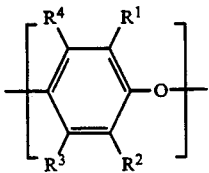

wherein each of $R^1$, $R^2$, $R^3$ and $R^4$ independently represents a hydrogen atom, a halogen atom, a phenyl group, or a group selected from the group consisting of a primary lower alkyl group having from 1 to 7 carbon atoms, a secondary lower alkyl group having from 1 to 7 carbon atoms, a haloalkyl group having from 1 to 7 carbon atoms, an amino alkyl group having from 1 to 7 carbon atoms, a hydrocarbyloxy group having from 1 to 7 carbon atoms and a halohydrocarbyloxy group having from 1 to 7 carbon atoms and having at least two carbon atoms between the halogen atom and the oxygen atom.

The reduced viscosity, as measured at 30° C. with respect to a chloroform solution having a concentration of 0.5 g/dl, of the PPE used in the present invention is generally in the range of from 0.15 to 0.70, preferably from 0.20 to 0.60. Representative examples of the above-mentioned PPE's include poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether), a polyphenylene ether copolymer, such as a copolymer of 2,6-dimethyl phenol and another phenol, such as 2,3,6-trimethyl phenol or 2-methyl-6-butyl phenol, and the like. Of these, poly(2,6-dimethyl-1,4-phenylene ether) and a copolymer of 2,6-dimethyl phenol and 2,3,6-trimethyl phenol are preferred, and poly(2,6-dimethyl-1,4-phenylene ether) is most preferred.

The PPE's used in the present invention can readily be produced by conventional methods. For example, a PPE which is produced by the oxidative polymerization of, for example, 2,6-xylenol, in the presence of a catalyst comprised of a complex of a cuprous salt and an amine according to the method of Hay as disclosed in U.S. Pat. No. 3,306,874 can advantageously be used in the present invention. Also, the PPE's used in the present invention can readily be produced by the methods as disclosed in U.S. Pat. Nos. 3,306,875; 3,257,357 and 3,257,358, Japanese Examined Patent Application Publication Specification No. 52-17880/1977, Japanese Patent Application Laid-Open Specifications Nos. 50-51197/1975 and 63-152628/1988.

In addition to the above-mentioned PPE's, the PPE used in the present invention can be a conventional modified PPE which is obtained by reacting a PPE with an α, β-unsaturated carboxylic acid or a derivative thereof in the presence or absence of a radical generator at a temperature of 80° to 350° C. in a molten state, a solution state or a slurry state. In this conventional modified PPE, 0.01 to 10% by weight of an α, β-unsaturated carboxylic acid or derivative thereof is bonded to PPE chains by a grafting or addition reaction. Further, the PPE used in the present invention can be a mixture of a PPE selected from the various known PPE's mentioned hereinbefore and the above-mentioned conventional modified PPE in arbitrary proportions.

Also, in the present invention, use can be made of a phosphorous compound-treated PPE as obtained by adding 0.2 to 5 parts by weight of 9, 10-dihydroxy-9-oxa-10-phosphaphenanthrene to 100 parts by weight of a PPE and subjecting the resultant mixture to melt-kneading. The phosphorus compound-treated PPE has an excellent color tone.

The polyolefin forming the particulate dispersed polyolefin phase (α) in the shaped resin article of the present invention is a polyolefin which is generally used as a conventional molding material and has a weight average molecular weight of not smaller than 30,000, as measured according to the customary gel permeation chromatography method. Representative examples of polyolefins include a high density polyethylene; an extremely high molecular weight high density polyethylene; a low density polyethylene; a linear low density polyethylene; an extremely low density polyethylene (having a density of less than 0.90); an isotactic polypropylene; poly(4-methyl-1-pentene); polybutene-1; and a copolymer of at least two different compounds selected from the group consisting of α-olefins (such as ethylene and propylene), ethylenically or acetylenically unsaturated carboxylic acids and derivatives thereof, such as a copolymer of ethylene and butene-1, a copolymer of ethylene and (meth)acrylic acid, a copolymer of ethylene and (meth)acrylic ester, a block or random copolymer of propylene and ethylene, a copolymer of propylene and 1-hexene and a copolymer of propylene and 4-methyl-1-pentene. These polyolefins can be used independently or in combination. Of these polyolefins, polyethylene is preferred. Of polyethylenes, a low density polyethylene, especially a linear low density polyethylene, and a high density polyethylene are more advantageously used.

The copolymer (hereinafter frequently referred to as "compatibility agent") to be cohered to the outer surface of the particulate dispersed polyolefin phase (α) and to be used for forming the particulate dispersed copolymer phase (β) in the shaped resin article of the present invention, includes a copolymer obtained by copolymerizing a vinyl aromatic compound with a conjugated diene compound, a hydrogenation product of the copolymer and a mixture of these. In the hydrogenation product, at least 50%, preferably at least 80%, of the olefinic double bonds attributed to the copolymerized conjugated diene compound are hydrogenated.

The compatibility agent may be a random copolymer, a block copolymer, a graft copolymer and a combination thereof each having a number average molecular weight of not smaller than 50,000, as measured according to the customary gel permeation chromatography method. Of these, such a block copolymer is preferred.

Representative examples of vinyl aromatic compounds for use in the preparation of the compatibility agent include at least one compound selected from the group consisting of styrene, α-methylstyrene, vinyltoluene, p-tert-butylstyrene, diphenylethylene and the like. Of these, styrene is preferred.

On the other hand, representative examples of conjugated diene compounds for use in the preparation of the compatibility agent include at least one compound selected from the group consisting of butadiene, isoprene, 1,3-pentadiene, 2,3-dimethyl-1,3-butadiene and the like. Of these, butadiene, isoprene and a combination thereof are preferred.

The method of preparing the compatibility agent is not critical. For example, a copolymer of styrene and butadiene or a hydrogenation product thereof can readily be produced by the anionic polymerization methods as described in British Patent No. 1,130,770 and U.S. Pat. Nos. 3,281,383 and 3,639,517 or as described in British Patent No. 1,020,720 and U.S. Pat. Nos. 3,333,024 and 4,501,857.

Of these compatibility agents, a block copolymer of a vinyl aromatic compound and a conjugated diene compound or a hydrogenation product thereof having a Young's modulus of 1,500 kg/cm$^2$ or more, is especially preferred.

The shaped resin article of the present invention has a specific morphology of dispersion. That is, as described hereinbefore, in the present invention, the shaped resin article comprises (1) a continuous phase of a polyphenylene ether and (2) a dispersed phase dispersed in the continuous phase (1). The dispersed phase (2) comprises (α) a particulate dispersed polyolefin phase which is comprised of a polyolefin and has a minor diameter of not greater than 0.5 μm, the outer surface of the dispersed polyolefin phase (α) having cohered thereto particles of at least one copolymer selected from the group consisting of a copolymer of a vinyl aromatic compound and a conjugated diene compound and a hydrogenation product thereof, and (β) a particulate dispersed copolymer phase having a minor diameter of not greater than 0.3 μm, which is comprised of at least one copolymer selected from the above-mentioned group and is dispersed in the continuous phase (1) and not cohered to the dispersed polyolefin phase (α).

The desired effects of the present invention can be attained by realizing the above-mentioned specific morphology of dispersion.

In the present invention, a polyphenylene ether, a polyolefin and at least one copolymer are present in proportions such that the polyolefin and the copolymer are dispersed in the polyphenylene ether to thereby form the continuous phase (1) and the dispersed phase (2) dispersed therein. Generally, the shaped resin article of the present invention comprises (A) 50 to 95% by weight, preferably from 50 to 90% by weight, of polyphenylene ether, (B) up to 20% by weight, preferably from 5 to 15% by weight, of polyolefin, and (C) up to 40% by weight, preferably from 10 to 35% by weight, of at least one copolymer selected from the group consisting of a copolymer of a vinyl aromatic compound and a conjugated diene compound and a hydrogenation product thereof, wherein the total amount of components (A), (B) and (C) is 100% by weight. However, the proportions of the polyphenylene ether, the polyolefin and the copolymer are not limited to the above-mentioned ranges as long as the specific morphology of dispersion as defined herein can be attained.

The shaped resin article of the present invention has remarkably improved weld-line toughness and delamination resistance and also excellent resistance to heat, impact and chemicals.

The minor diameters of the particulate dispersed polyolefin phase (α) and the particulate dispersed copolymer phase (β) affect the weld-line toughness and delamination resistance of the shaped article. When the minor diameter of the dispersed polyolefin phase ($\neq 0$) exceeds 0.5 μm or when the minor diameter of the dispersed copolymer phase (β) exceeds 0.3 μm, marked delamination is likely to occur, and weld-line toughness is likely to be extremely poor. On the other hand, the major diameters of the particulate dispersed polyolefin phase (α) and the particulate dispersed copolymer phase (β) are not critical in the present invention, and can widely vary depending on the pressure applied during molding, presence or absence of a plasticizer, etc.

The dispersion morphology of the polyolefin and compatibility agent forming dispersed phases in the polyphenylene ether can generally be observed easily by an electron photomicrograph (magnification: for example, 40,000-fold) of a cross section of the shaped resin article (see FIGS. 1 and 2). With respect to each of the dispersed polyolefin phase (α) and the dispersed copolymer phase (β), generally, the ratio of major diameter to minor diameter is not smaller than 1. When the ratio of major diameter to minor diameter is 1, the dispersed phase exhibits a circular form, and when the ratio of major diameter to minor diameter is more than 1, the dispersed phase exhibits a fibril form, a lamella form or a similar form. When the dispersed phase [meaning each of the particulate dispersed polyolefin phase (α) and the particulate dispersed copolymer phase (β)] has a circular form, the minor diameter is equal to the major diameter, each of which corresponds to the diameter of a circle. On the other hand, when the dispersed phase has a fibril form, a lamella form or a similar form, the terminology "minor diameter" used herein means the maximum of distances between opposite points on the periphery of the fibril form, lamella form or similar form, wherein the opposite points are positioned on opposite sides of a longitudinal axis of the dispersed phase (which is defined as a central line extending along the length of the dispersed phase) and each set of opposite points is positioned on a line perpendicular to the above-mentioned longitudinal axis. In this connection, it should be noted that the minor diameter of the particulate dispersed polyolefin phase (α) does not include the copolymer particles cohered thereto. When the dispersed phase has a lamella form, a fibril form or a similar form, the terminology "major diameter" used herein means the maximum of distances between opposite points on the periphery of the fibril form, lamella form or similar form, wherein the opposite points are positioned on opposite sides of a short axis of the dispersed phase (which is defined as a central line extending in a direction perpendicular to the above-mentioned longitudinal axis) and each set of opposite points is positioned on a line parallel to the above-mentioned longitudinal axis. The expression "the particulate dispersed polyolefin phase (α) has a minor diameter of not greater than 0.5 μm" used herein means that at least 90% of particles of the particulate dispersed polyolefin phase (α) have a minor diameter, as defined above, of not greater than 0.5 μm. Likewise, the expression "the particulate dispersed copolymer phase (β) has a minor diameter of not greater than 0.3 μm" used herein means that at least 90% of particles of the particulate dispersed copolymer phase (β) have a minor diameter, as defined above, of not greater than 0.3 μm.

The condition of coherence of the compatibility agent to the outer surface of the dispersed polyolefin phase (α) can also easily be observed on an electron photomicrograph (magnification: for example, 40,000-fold) of a cross section of the shaped resin article.

The terminology "cohered" used herein means a configuration in which a number of particles of the compatibility agent gather around and cohere to the outer surface of the dispersed polyolefin phase in the form of isolated particles or in the form of a layer of particles. In this connection, it is noted that in the cohered configuration, it is possible that some particles of the compatibility agent penetrate the interior of the dispersed polyolefin phase (α). The minor diameter of the cohered particles of the compatibility agent is not critical in the present invention. However, it is preferred that the minor diameter be smaller than that of the dispersed polyolefin particles.

In the present invention, as described above, it is essential to realize the specific morphology of dispersion. To attain the specific morphology of dispersion, it is preferred that the above-mentioned polyphenylene ether, polyolefin and compatibility agent be kneaded using a twin or multi-screw extruder into which a kneading block can be incorporated at any portion of the screws, the extruder having the following characteristics:

(1) $L/D \geq 1.5$, preferably $L/D \geq 5$ wherein L represents the length (mm) of the kneading block, and D represents the maximum outer diameter (mm) of the kneading block, and (2) $\pi \cdot D' \cdot N/h \geq 50$ wherein π is 3.14, D' represents the screw outer diameter (mm) in the metering zone, N represents the screw revolution rate (number of revolutions/second), and h represents the depth (mm) of the groove in the metering zone.

In effecting the kneading, it is preferred that the polyphenylene ether, the polyolefin and the compatibility agent be supplied to the extruder all at one time to effect melt kneading thereof while maintaining a portion of the barrel of the extruder corresponding to the kneading block at a temperature which is not higher than the glass transition temperature (about 210° C.) of the PPE.

From the viewpoint of ease in obtaining a shaped resin article having the desired morphology of dispersion, it is preferred to use as the compatibility agent at least one copolymer selected from the group consisting of a copolymer of a vinyl aromatic compound and a conjugated diene compound and a hydrogenation product thereof each having a Young's modulus of 1,500 Kg/cm² or higher.

The shaped resin article of the present invention prepared as described above has not only remarkably improved weld-line toughness and delamination resistance but also excellent resistance to heat, impact and chemicals.

In addition to the above-mentioned essential components, the shaped resin article of the present invention may optionally contain other resins such as polystyrene resins (e.g., polystyrene and high impact polystyrene) and additives such as antioxidants, weathering resistance improvers, nucleating agents for the polyolefin forming the dispersed polyolefin phase (α), lubricants, organic or inorganic fillers and reinforcing materials (e.g., glass fiber, carbon fiber, whisker, mica, talc, calcium carbonate, potassium titanate and wollastonite), fire retardants, plasticizers (e.g., phosphorus compounds such as triphenylphosphate), colorants, antistatic agents and mold release agents, as long as the characteristic features of the shaped resin article of the present invention are not adversely affected.

The molding method for producing the shaped resin article of the present invention is not limited as long as in the final shaped resin article the polyolefin and the compatibility agent dispersed in the continuous phase of the polyphenylene ether exhibit the above-mentioned specific dispersion morphology. The shaped resin article of the present invention may be a pellet. Further, the shaped resin article of the present invention may be a compression-molded article, an injection-molded article, an extrusion-molded article, a blow-molded article or an inflation-molded article, which article is suitably shaped for an ultimate use.

The shaped resin article of the present invention is useful as various parts. Representative examples of such parts include automobile parts, e.g., exterior parts such as bumpers, fenders, door panels, various moles, emblems, engine hoods, wheel caps, roofs and spoilers, and interior parts such as instrument panels, console boxes and trims. Further, the shaped resin article of the present invention can also suitably be used as interior and exterior parts of electrical appliances. Representative examples of such exterior and interior parts include cabinets for office automation machines, television sets, video units, TV game sets and various disc players, and parts of refrigerators and the like.

The shaped resin article of the present invention is excellent in not only delamination resistance and weld-line toughness but also resistance to heat, impact and chemicals.

BEST MODE FOR CARRYING OUT THE INVENTION

The present invention will be described in more detail with reference to the Examples, which should not be construed as limiting the scope of the present invention.

In the Examples and Comparative Examples, use is made of a test piece having a weld-line, which means an ASTM Type I dumbbell specimen (thickness: ⅛ inch) for tensile test having a weld-line in the middle portion thereof.

EXAMPLE 1

70 parts by weight of a PPE having a reduced viscosity of 0.56, 10 parts by weight of a low density polyethylene having a density of 0.918 g/cm³ (Suntec® LD-M1804 manufactured and sold by Asahi Chemical Industry Co., Ltd., Japan), 10 parts by weight of a styrene-butadiene copolymer (Asaflex® 810 manufactured and sold by Asahi Chemical Industry Co., Ltd., Japan and having a Young's modulus of 4,600 Kg/cm²), 10 parts by weight of a styrene-butadiene copolymer (Solprene® T406 manufactured and sold by Japan Elastomer Co., Ltd., Japan and having a Young's modulus of 2,100 kg/cm²), 1.5 parts by weight of 9,10-dihydro-9-oxa-10-phosphaphenanthrene and 7 parts by weight of triphenylphosphate were blended by a Henschel mixer. The resultant blend was subjected to melt kneading by a same direction-revolving twin-screw extruder (model PCM-30 manufactured and sold by Ikegai Tekko Co., Ltd., Japan) under conditions such that the kneading block portions of the screws were maintained at 190° C. and the other portions were maintained at 270° C. and that the L/D ratio, as defined hereinbefore, of each of the kneading blocks was 9.3 and the $\pi \cdot D' \cdot N/h$ value, as defined hereinbefore, was 157, and then extruded into strands. The obtained strands were pelletized. The resultant pellets were subjected to injection molding at a mold temperature of 80° C. by means of a screw in-line type injection molding machine which was set at 280° to 300° C., thereby obtaining test pieces for tensile testing. Using the test pieces, a tensile testing was conducted in accordance with ASTM D-638. When the cross section of the test pieces obtained by the tensile testing was examined, no delamination was observed.

Separately, the same pellets as obtained above were subjected to injection molding using a mold which was designed to form a weld-line, thereby obtaining test pieces for tensile testing. The test pieces having a weld-line were subjected to a tensile testing in accordance with ASTM D-638, to examine the weld-line toughness (%) which is expressed by the following formula:

$$\text{Weld-line toughness (\%)} = \frac{\text{tensile strength of a test piece having a weld-line}}{\text{tensile strength of a test piece having no weld-line}}.$$

As a result, the weld-line toughness found to be 97%.

Further, a test piece for tensile testing was injection molded according to the method as described above, and sliced to obtain a section, which was dyed with osmic acid ($OsO_4$). The section was photographed by means of a transmission electron microscope to closely examine the dispersion morphology of the test piece (see FIG. 1). As a result, it was found that the test piece had a dispersion morphology such that in the continuous phase of the PPE, low density polyethylene particles having a minor diameter of not greater than 0.5 μm and styrene-butadiene copolymer particles having a minor diameter of not greater than 0.1 μm were dispersed, and that styrene-butadiene copolymer particles were cohered to the outer surface of the dispersed low density polyethylene particles.

COMPARATIVE EXAMPLE 1

Melt kneading and injection molding were conducted in substantially the same manner as in Example 1 except that a reverse direction-revolving twin screw extruder (manufactured and sold by Nakatani Kikai K.K., Japan; diameter: 30 mm) was employed, and that the L/D ratio, as defined hereinbefore, of the kneading block was 0 (a kneading block cannot be assembled into the screws of the extruder), the value of $\pi \cdot D' \cdot N/h$, as defined hereinbefore, was 36.2 and the extruder was set at 240° to 270° C., thereby obtaining test pieces for tensile testing. When the test pieces were subjected to a tensile testing in the same manner as in Example 1, delamination was markedly observed on the surface portion of the cross-section of the test pieces.

The weld-line toughness of a test piece having a weld-line was found to be 64%.

Further, a test piece for tensile testing was injection molded according to the method as described above, and subjected to an examination of the dispersion morphology of the components in the same manner as in Example 1. As a result, it was found that the test piece had a dispersion morphology such that in the continuous phase of the PPE, low density polyethylene particles having a minor diameter of 0.4 to 1.7 μm (with most of the particles having a minor diameter exceeding 0.5 μm) and styrene-butadiene copolymer particles having a minor diameter of 0.5 to 1.8 μm (with most of the particles having a minor diameter exceeding 0.3 μm) were dispersed, part of the styrene-butadiene copolymer particles being cohered to the outer surface of the low density polyethylene particles.

EXAMPLES 2 and 3 and COMPARATIVE EXAMPLES 2 and 3

76 Parts by weight of a PPE having a reduced viscosity of 0.49, 8 parts by weight of a high density polyethylene having a density of 0.969 g/cm³ (Suntec® HD-J240 manufactured and sold by Asahi Chemical Industry Co., Ltd., Japan), 8 parts by weight of a hydrogenation product of a styrene-butadiene block copolymer (hydrogenation ratio of the polybutadiene segment: 99.9%; Young's modulus: 3,200 kg/cm²) and 8 parts by weight of a hydrogenation product of a styrene-butadiene block copolymer (hydrogenation ratio of polybutadiene segments: 99.9%; Young's modulus: 5,300 kg/cm²) were blended by a Henschel mixer. The resultant blend was subjected to melt kneading by a same direction-revolving twin-screw extruder (model PCM-30 manufactured and sold by Ikegai Tekko Co., Ltd., Japan) under conditions such that the kneading block portions of the screws were maintained at 200° C. and the other portions were maintained at 270° C., thereby obtaining strands. In Example 2, the L/D ratio, as defined hereinbefore, was 4.1 and the $\pi \cdot D' \cdot N/h$ value, as defined hereinbefore, was 94.2. In Example 3, the L/D ratio was 14, and the $\pi \cdot D' \cdot N/h$ value was 62.9. In Comparative Example 2, the L/D ratio was 2.0, and the $\pi \cdot D' \cdot N/h$ value was 37.7. In Comparative Example 3, the L/D ratio was 0, and the $\pi \cdot D' \cdot N/h$ value was 62.9.

The obtained strands were pelletized. The resultant pellets were subjected to injection molding by means of a screw in-line type injection molding machine having a cylinder temperature of 280° to 300° C. at a mold temperature of 80° C., thereby obtaining test pieces for tensile testing. Using the test pieces, a tensile testing was conducted in accordance with ASTM D-638 in the same manner as in Example 1. When the cross-section of each of the test pieces obtained in Examples 2 and 3 was examined, no delamination was observed. However, with respect to the test pieces obtained in Comparative Examples 2 and 3, delamination was markedly observed on the cross-section of the test pieces although the test pieces had the same composition as those of Examples 2 and 3.

Further, when the pieces having a weld-line were subjected to a tensile testing, it was found that the test pieces of Examples 2 and 3 had weld-line toughness values of 91% and 84%, respectively, and that the test pieces of Comparative Examples 2 and 3 had weld-line toughness values of 71% and 63%, respectively.

Further, test pieces for tensile testing were injection molded according to the method as described above and sliced to obtain sections which were dyed with ruthenic acid ($RuO_4$) The sections were photographed by means of a transmission electron microscope, to closely examine the dispersion morphology of the test pieces. As a result, it was found that in the test pieces of Examples 2 and 3, high density polyethylene particles having a minor diameter of not greater than 0.5 μm were dispersed in the PPE, whereas in the test piece of Comparative Example 2, high density polyethylene particles having a minor diameter of 0.5 μm to 1.0 μm (with most of the particles having a minor diameter exceeding 0.5 μm) were dispersed in the PPE and in the test piece of Comparative Example 3, high density polyethylene particles having a minor diameter of 0.5 μm to 2.3 μm (with most of the particles having a minor diameter exceeding 0.5 μm) were dispersed in the PPE. With respect to each of Examples 2 and 3 and Comparative Examples 2 and 3, particles of the hydrogenation product of a styrene-butadiene block copolymer used as the compatibility agent cohered to the outer surface of the high density polyethylene particles. In Examples 2 and 3, the dispersed particles of the hydrogenated styrene butadiene block copolymer used as the compatibility agent which were not cohered to the dispersed particulate polyethylene phase, had a minor diameter of not greater than 0.1 μm, whereas in Comparative Examples 2 and 3, the dispersed particles of the compatibility agent which were not cohered to the dispersed particulate polyethylene, had a minor diameter of 0.1 to 0.9 μm (with most of the particles having a diameter exceeding 0.3 μm).

COMPARATIVE EXAMPLE 4

Composition According to U.S. Pat. No. 4,145,377

A low density polyethylene referred to as component (c1) and a hydrogenated styrene-butadiene-styrene block copolymer referred to as component (c2), as defined in the footnote of Table 1, were melt kneaded in weight proportions indicated in Table 1 at a temperature of from 200° to 240° C. by means of a same direction-revolving twin-screw extruder (model PCM-30 manufactured and sold by Ikegai Tekko Kabushiki Kaisha, Japan), thereby obtaining precompound (P). Then, a polyphenylene ether referred to as component (a), a polystyrene referred to as component (b) and a hydrogenated styrene-butadiene-styrene block copolymer referred to as component (d), as defined in the footnote of Table 1, were melt kneaded in weight proportions indicated in Table 1 with the above-obtained precompound (P) by means of the above-mentioned twin-screw extruder at a temperature of from 230° to 280° C. and at a screw speed of 200 rpm, and extruded, thereby obtaining strands. The thus obtained strands were pelletized, thereby obtaining pellets.

TABLE 1

| Component | Formulation | (parts by weight) |
|---|---|---|
| (a) | PPE[a] | 74 |
| (b) | Polystyrene[b] | 8 |
| (c1) | LDPE[c1] | 6 ⎫ premixed |
| (c2) | HTR[c2] | 6 ⎭ |
| (d) | HTR[d] | 6 |

Note:
[a]polyphenylene ether having a reduced viscosity of 0.57
[b]polystyrene, Styron ® 685 (a product of Asahi Chemical Ind. Co., Ltd., Japan)
[c1]low density polyethylene (density: 0.918 g/cm³), Suntec ® LD-M1804 (a product of Asahi Chemical Ind. Co., Ltd., Japan)
[c2]hydrogenated styrene-butadiene-styrene block copolymer, Shell Kraton ® G-1650 (a product of Shell Chemical Co., U.S.A.)
[d]same as component (c2)

The thus obtained pellets were charged into a screw in-line type injection molding machine having a cylinder temperature of from 280° to 300° C., and injection molded at a mold temperature of 80° C. to obtain a test piece for use in tensile testing. A tensile testing was conducted using a test piece in accordance with ASTM D-638. The broken section of the test piece was observed. As a result, a marked delamination was found at the surfaces of the broken sections of the test piece.

Further, using a metal mold designed to form a weld-line, a test piece for use in tensile testing was injection molded. A tensile testing of the test piece was conducted in the same manner (ASTM D-638) as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of the test piece was found to be 66%.

Still further, a test piece for tensile testing was injection molded according to the method as described above, and a section of the test piece was dyed with ruthenic acid ($RuO_4$). The section was photographed using a transmission electron microscope. The electron photomicrograph showed that the outer surface of the dispersed low density polyethylene particles had the hydrogenated styrene-butadiene-styrene block copolymer cohered thereto, and that however, the low density polyethylene particles were dispersed in the polyphenylene ether in minor diameters ranging from 0.8 to 2.9 μm (greater than 0.5 μm and so outside the scope of the present invention) and the hydrogenated styrene-butadiene-styrene block copolymer particles were dispersed in the polyphenylene ether in minor diameters ranging from 0.9 to 2.1 μm (greater than 0.3 μm and so outside the scope of the present invention).

COMPARATIVE EXAMPLE 5

Composition According to U.S. Pat. No. 4,166,055

A polyphenylene ether referred to as component (a), a low density polyethylene referred to as component (b1), a hydrogenated styrene-butadiene-styrene block copolymer referred to as component (b2) and a triphenyl phosphate referred to as component (c), as defined in the footnote of Table 2, were melt kneaded in weight proportions indicated in Table 2 by means of a same direction-revolving twin-screw extruder (model PCM-30 manufactured and sold by Ikegai Tekko Kabushiki Kaisha, Japan) at a temperature of from 230° to 280° C. and at a screw speed of 200 rpm, and extruded, thereby obtaining strands. The thus obtained strands were pelletized, thereby obtaining pellets.

The thus obtained pellets were charged into a screw in-line type injection molding machine having a cylinder temperature of from 280° to 300° C., and injection molded at a mold temperature of 80° C. to obtain a test piece for use in tensile testing. A tensile testing was conducted using a test piece in accordance with ASTM D-638.

The broken sections of the test piece were observed. As a result, a marked delamination was found at the surfaces of the broken sections of the test piece.

Further, using a metal mold designed to form a weld-line, a test piece for use in tensile testing was injection molded. A tensile testing of the test piece was conducted in the same manner (ASTM D-638) as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of the test piece was found to be 59%.

Still further, a test piece for tensile testing was injection molded according to the method as described above, and a section of the test piece was dyed with ruthenic acid (RuO$_4$), and the section was photographed using a transmission electron microscope. The electron photomicrograph showed that the outer surface of the dispersed low density polyethylene particles had the hydrogenated styrene-butadiene-styrene block copolymer cohered thereto, and that, however, the low density polyethylene particles were dispersed in the polyphenylene ether in minor diameters ranging from 1.1 to 2.2 μm (greater than 0.5 μm and so outside the scope of the present invention) and the hydrogenated styrene-butadiene-styrene block copolymer particles were dispersed in the polyphenylene ether in minor diameters ranging from 0.7 to 2.3 μm (greater than 0.3 μm and so outside the scope of the present invention).

COMPARATIVE EXAMPLE 6

Composition According to U.S. Pat. No. 4,239,673

Substantially the same procedure as described in Comparative Example 5 was repeated except that 12 parts by weight of a styrene-butadiene-styrene block copolymer referred to as component (b3), as defined in the footnote of Table 2, was used instead of a hydrogenated styrene-butadiene-styrene block copolymer, thereby obtaining a test piece. The properties of the test piece were determined in the same manner as described in Comparative Example 5. As a result, a marked delamination was found at the surfaces of the broken sections of the test piece. Further, the weld-line toughness of the test piece was found to be 68%. Still further, a test piece for tensile testing was injection molded according to the method as described above, and a section of the test piece was dyed with osmic acid (OsO$_4$) The section was photographed using a transmission electron microscope. The electron photomicrograph showed that the outer surface of the dispersed low density polyethylene particles had the styrene-butadiene-styrene block copolymer cohered thereto, and that, however, the low density polyethylene particles were dispersed in the polyphenylene ether in minor diameters ranging from 0.8 to 2.5 μm (greater than 0.5 μm and so outside the scope of the present invention) and the styrene-butadiene-styrene block copolymer particles were dispersed in the polyphenylene ether in minor diameters ranging from 0.5 to 2.4 μm (greater than 0.3 μm and so outside the scope of the present invention).

COMPARATIVE EXAMPLE 7

Composition According to U.S. Pat. No. 4,242,263

Substantially the same procedure as described in Comparative Example 5 was repeated except that 6 parts by weight of the styrene-butadiene-styrene block copolymer referred to as component (b3) was added and the amount of the hydrogenated styrene-butadiene-styrene block copolymer was changed to 6 parts by weight from 12 parts by weight, thereby obtaining test pieces. The properties of the test pieces were determined in the same manner as described in Comparative Example 5. As a result, a marked delamination was found at the surfaces of the broken sections of a test piece. Further, the weld-line toughness of a test piece was found to be 51%. Still further, a section of a test piece for tensile testing was dyed with ruthenic acid (RuO$_4$), and the section was photographed using a transmission electron microscope. The electron photomicrograph showed that the outer surface of the low density polyethylene had the styrene-butadiene-styrene block copolymer and the hydrogenated styrene-butadiene-styrene block copolymer cohered thereto, and that however, the low density polyethylene was dispersed in the polyphenylene ether in minor diameters ranging from 1.3 to 2.6 μm (greater than 5 μm and so outside the scope of the present invention) and the styrene-butadiene-styrene block copolymer and the hydrogenated styrene-butadiene-styrene block copolymer were dispersed in the polyphenylene ether in minor diameters ranging from 1.1 to 2.8 μm (greater than 0.3 μm and so outside the scope of the present invention).

TABLE 2

| Component | | Formulation (parts by weight) | | |
|---|---|---|---|---|
| | | Comparative Example 5 | Comparative Example 6 | Comparative Example 7 |
| (a) | PPE[a] | 82 | 82 | 82 |
| (b1) | LDPE[b1] | 6 | 6 | 6 |
| (b2) | HTR[b2] | 12 | — | 6 |
| (b3) | TR[b3] | — | 12 | 6 |
| (c) | TPP[c] | 15 | 15 | 15 |

Note:
[a] polyphenylene ether having a reduced viscosity of 0.57
[b1] low density polyethylene (density: 0.918 g/cm$^3$), Suntec ® LD-M1804 (a product of Asahi Chemical Ind. Co., Ltd., Japan)
[b2] hydrogenated styrene-butadiene-styrene block copolymer, Shell Kraton ® G-1650 (a product of Shell Chemical Co., U.S.A.)
[b3] styrene-butadiene-styrene block copolymer, Shell Kraton ® D-1101 (a product of Shell Chemical Co., U.S.A.)
[c] triphenyl phosphate (plasticizer)

COMPARATIVE EXAMPLE 8

Composition According to Japanese Patent Application Laid-Open Specification Nos. 63-218748 (1988), 63-245453 (1988) and 64-40556 (1989)

A low density polyethylene referred to as component (c1) and a styrene-butadiene radial teleblock copolymer referred to as component (c2), as defined in the footnote of Table 3, were melt kneaded in weight proportions indicated in Table 3 at a temperature of from 200° to 240° C. by means of a same direction-revolving twin-screw extruder (model PCM-30 manufactured and sold by Ikegai Tekko Kabushiki Kaisha, Japan), thereby obtaining precompound (P). Then, a polyphenylene ether referred to as component (a) and a polystyrene referred to as component (b), as defined in the footnote of Table 3, were melt kneaded in weight proportions indicated in Table 3 with the above-obtained precompound (P) by means of the above-mentioned twin-screw extruder at a temperature of from 230° to 280° C. and at a screw revolving speed of 200 rpm, and extruded, thereby obtaining strands. The thus obtained strands were pelletized, thereby obtaining pellets.

TABLE 3

| Component | Formulation | (parts by weight) | |
|---|---|---|---|
| (a) | PPE[a] | 72 | |
| (b) | Polystyrene[b] | 16 | |
| (c1) | LDPE[c1] | 6 | } premixed |

TABLE 3-continued

| Component | Formulation | (parts by weight) |
|---|---|---|
| (c2) | TR[c)] | 6 |

Note:
[a)]polyphenylene ether having a reduced viscosity of 0.57
[b)]polystyrene, Styron ® 685 (a product of Asahi Chemical Ind. Co., Ltd., Japan)
[c)]low-density polyethylene having a density of 0.918 g/cm³, Suntec ® LD-M1804 (a product of Asahi Chemical Ind. Co., Ltd., Japan)
[c2)]styrene-butadiene radial teleblock copolymer (Young's modulus: 3,200 Kg/cm²)

The thus obtained pellets were charged into a screw in-line type injection molding machine having a cylinder temperature of from 280° to 300° C., and injection molded at a mold temperature of 80° C. to obtain a test piece for use in tensile testing. A tensile testing was conducted using a test piece in accordance with ASTM D-638. The broken section of the test piece was observed. As a result, no delamination was found at the surfaces of the broken sections of the test piece.

Further, using a metal mold designed to form a weld-line, a test piece for use in tensile testing was injection molded. A tensile testing of the test piece was conducted in the same manner (ASTM D-638) as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of the test piece was found to be 72%.

Still further, a test piece for tensile testing was injection molded according to the method as described above, and a section of the test piece was dyed with osmic acid ($OsO_4$). The section was photographed using a transmission electron microscope. The electron photomicrograph showed that the low density polyethylene particles were dispersed in the polyphenylene ether in minor diameters ranging from 0.3 to 1.1 μm (most of the particles having minor diameters of greater than 0.5 μm and so outside the scope of the present invention), and the outer surface of the dispersed low density polyethylene particles had the styrene-butadiene radial teleblock copolymer cohered thereto in the form of a layer and no styrene-butadiene radial teleblock copolymer having a minor diameter of not greater than 0.3 μm was independently dispersed in the polyphenylene ether.

EXAMPLES 4 TO 6

Each of the compositions indicated in Table 4 was melt kneaded by means of the same direction-revolving twin-screw extruder (model PCM-30 manufactured and sold by Ikegai Tekko Kabushiki Kaisha, Japan) as described in Example 1 under the same conditions as described in Example 1, thereby obtaining strands. The thus obtained strands were pelletized, thereby obtaining pellets.

TABLE 4

| Component | | Formulation (parts by weight) | | |
|---|---|---|---|---|
| | | Example 4 | Example 5 | Example 6 |
| (a) | PPE[a)] | 66 | 63 | 78 |
| (b) | HDPE[b)] | 5 | 10 | 7 |
| (c) | HTR[c)] | 29 | 27 | 15 |
| (d) | TPP[d)] | — | — | 15 |

Note:
[a)]polyphenylene ether having a reduced viscosity of 0.54
[b)]high-density polyethylene (density: 0.918 g/cm³), Suntec ® J240 (a product of Asahi Chemical Ind. Co., Ltd., Japan)
[c)]hydrogenated styrene-butadiene-styrene block copolymer (Young's modulus: 5,100 kg/cm², ratio of hydrogenation: 99.9%)
[d)]triphenyl phosphate (plasticizer)

The thus obtained pellets were charged into a screw in-line type injection molding machine having a cylinder temperature of from 280° to 300° C., and injection molded at a mold temperature of 80° C. to obtain test pieces for use in tensile testing. A tensile testing was conducted using each of the test pieces in accordance with ASTM D-638. The broken sections of each of the test pieces were observed. As a result, no delamination was found at the surfaces of the broken sections of each of the test pieces of Examples 4 to 6.

Further, using a metal mold designed to form a weld-line, test pieces for use in tensile testing were injection molded. A tensile testing of the test pieces was conducted in the same manner (ASTM D-638) as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of each of the test pieces of Examples 4 to 6 was found to be 100%.

Still further, a test piece for tensile testing was injection molded according to the method as described above, and a section of each of the test pieces for tensile testing was dyed with ruthenic acid ($RuO_4$). The section was photographed using a transmission electron microscope. As a result, it was found that each of the test pieces of Examples 4 to 6 (see FIG. 2 for the dispersion morphology of the cross section of the test piece of Example 5) had a morphology of dispersion such that the high density polyethylene particles were dispersed in a minor diameter of not greater than 0.5 μm and the hydrogenated block copolymer of styrene and butadiene was cohered to the outer surface of the dispersed high density polyethylene phase in the form of a layer of particles. The hydrogenated block copolymer of styrene and butadiene, which was independently dispersed in the polyphenylene ether, had a minor diameter of not greater than 0.1 μm.

EXAMPLES 7 TO 9

Each of the compositions indicated in Table 5 was melt kneaded by means of the same direction-revolving twin-screw extruder (model PCM-30 manufactured and sold by Ikegai Tekko Kabushiki Kaisha, Japan) as described in Example 1 under the same conditions as described in Example 1, thereby obtaining strands. The thus obtained strands were pelletized, thereby obtaining pellets.

TABLE 5

| Component | | Formulation (parts by weight) | | |
|---|---|---|---|---|
| | | Example 7 | Example 8 | Example 9 |
| (a) | PPE[a)] | 55 | 80 | 86 |

TABLE 5-continued

| Component | | Formulation (parts by weight) | | |
|---|---|---|---|---|
| | | Example 7 | Example 8 | Example 9 |
| (b) | PP[b] | 15 | 5 | 7 |
| (c1) | HTR[c1] | 30 | 15 | — |
| (c2) | HTR[c2] | — | — | 7 |
| (d) | TPP[d] | — | 15 | 15 |

Note:
[a] polyphenylene ether having a reduced viscosity of 0.41
[b] polypropylene, E-1100 (a product of Asahi Chemical Ind. Co., Ltd., Japan)
[c1] hydrogenated styrene-butadiene-styrene block copolymer (Young's modulus: 6,300 kg/cm², ratio of hydrogenation: 99.9%)
[c2] hydrogenated styrene-butadiene-styrene block copolymer (Young's modulus: 4,800 kg/cm², ratio of hydrogenation: 99.9%)
[d] triphenyl phosphate (plasticizer)

The thus obtained pellets were charged into a screw in-line type injection molding machine having a cylinder temperature of from 280° to 300° C., and injection molded at a mold temperature of 80° C. to obtain test pieces for use in tensile testing. A tensile testing was conducted using the test pieces in accordance with ASTM D-638. The broken sections of the test pieces were observed. As a result, no delamination was found at the surfaces of the broken sections of each of the test pieces of Examples 7 to 9.

Further, using a metal mold designed to form a weld-line, test pieces for use in tensile testing were injection molded. A tensile testing of the test pieces was conducted in the same manner (ASTM D-638) as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of each of the test pieces of Examples 7 to 9 was found to be 100%.

Still further, test pieces for tensile testing were injection molded according to the method as described above, and sections of the test pieces were dyed with ruthenic acid ($RuO_4$). The sections were photographed using a transmission electron microscope. As a result, it was found that each of the test pieces of Examples 7 to 9 had a morphology of dispersion such that the polypropylene particles were dispersed in a minor diameter of not greater than 0.5 μm and the hydrogenated block copolymer of styrene and butadiene was cohered to the outer surface of the dispersed polypropylene phase in the form of a layer of particles. The hydrogenated block copolymer of styrene and butadiene, which was independently dispersed in the polyphenylene ether, had a minor diameter of not greater than 0.1 μm.

EXAMPLES 10 TO 12

Each of the compositions indicated in Table 6 was melt kneaded by means of the same direction-revolving twin-screw extruder (model PCM-30 manufactured and sold by Ikegai Tekko Kabushiki Kaisha, Japan) as described in Example 1 under the same conditions as described in Example 1, thereby obtaining strands. The thus obtained strands were pelletized, thereby obtaining pellets.

TABLE 6

| Component | | Formulation (parts by weight) | | |
|---|---|---|---|---|
| | | Example 10 | Example 11 | Example 12 |
| (a) | PPE[a] | 55 | 75 | 84 |

TABLE 6-continued

| Component | | Formulation (parts by weight) | | |
|---|---|---|---|---|
| | | Example 10 | Example 11 | Example 12 |
| (b1) | PP[b1] | 7 | — | — |
| (b2) | LDPE[b2] | 8 | 10 | 8 |
| (c1) | HTR[c1] | 30 | 15 | — |
| (c2) | HTR[c2] | — | — | 8 |
| (d) | TPP[d] | — | 15 | 15 |

Note:
[a] polyphenylene ether having a reduced viscosity of 0.41
[b1] polypropylene, E-1100 (a product of Asahi Chemical Ind. Co., Ltd., Japan)
[b2] low density polyethylene having a density of 0.918 g/cm³, Suntec ® LD-M1804 (a product of Asahi Chemical Ind. Co., Ltd., Japan)
[c1] hydrogenated styrene-butadiene-styrene block copolymer (Young's modulus: 5,800 kg/cm², ratio of hydrogenation: 99.9%)
[c2] hydrogenated styrene-butadiene-styrene block copolymer (Young's modulus: 4,800 kg/cm², ratio of hydrogenation: 99.9%)
[d] triphenyl phosphate (plasticizer)

The thus obtained pellets were charged into a screw in-line type injection molding machine having a cylinder temperature of from 280° to 300° C., and injection molded at a mold temperature of 80° C. to obtain test pieces for use in tensile testing. A tensile testing was conducted using the test pieces in accordance with ASTM D-638. The broken sections of the test pieces were observed. As a result, no delamination was found at the surfaces of the broken sections of each of the test pieces of Examples 10 to 12.

Further, using a metal mold designed to form a weld-line, test pieces for use in tensile testing were injection molded. A tensile testing of the test pieces was conducted in the same manner (ASTM D-638]as mentioned above, and the weld-line toughness as defined below was determined.

$$\text{Weld-line toughness (\%)} = \frac{\text{tensile strength of a test piece having a weld-line}}{\text{tensile strength of a test piece having no weld-line}} \times 100$$

The weld-line toughness of each of the test pieces of Examples of 10 to 12 was found to be 100%.

Still further, test pieces for tensile testing were injection molded according to the method as described above, and sections of the test pieces were dyed with ruthenic acid ($RuO_4$). The sections were photographed using a transmission electron microscope. As a result, it was found that each of the test pieces of Examples 10 to 12 had a morphology of dispersion such that the polypropylene and low density polyethylene particles were dispersed in a minor diameter of not greater than 0.5 μm and the hydrogenated block copolymer of styrene and butadiene was cohered to the outer surface of the dispersed polypropylene phase in the form of a layer of particles. The hydrogenated block copolymer of styrene and butadiene, which was independently dispersed in the polyphenylene ether, had a minor diameter of not greater than 0.1 μm.

EXAMPLE 13

65 parts by weight of a polyphenylene ether having a reduced viscosity of 0.54, 15 parts by weight of a linear low density polyethylene (Suntec ® LL-LM7625 having a density of 0.926 g/cm³ and manufactured and sold by Asahi Chemical Industry Co., Ltd., Japan), 10 parts by weight of a hydrogenated copolymer of styrene and butadiene (Young's modulus: 4,800 kg/cm², ratio of hydrogenation: 99.9%) and 10 parts by weight of a copolymer of styrene and butadiene (Young's modulus:

2,100 kg/cm², Solprene ® T406 manufactured and sold by Japan Elastomer Co., Ltd., Japan), were mixed together by means of a Henschel mixer. The obtained mixture was melt kneaded by means of the same extruder as described in Example 1 under the same conditions as described in Example 1, thereby obtaining strands. The thus obtained strands were pelletized, thereby obtaining pellets. A section of the thus obtained pellets was dyed with ruthenic acid ($RuO_4$), and the section was photographed using a transmission electron microscope. As a result, it was found that the pellets had a morphology of dispersion such that the linear low density polyethylene was dispersed in a minor diameter of not greater than 0.5 $\mu$m, and the block copolymer as a compatibility agent was melted into the dispersed linear low density polyethylene and cohering to the outer surface of the dispersed linear low density polyethylene in the form of a layer of particles. The block copolymer, which was independently dispersed in the polyphenylene ether, had a minor diameter of not greater than 0.1 $\mu$m.

EXAMPLE 14

The pellets obtained in Example 1 were charged into a screw in-line type injection molding machine having a cylinder temperature of from 280° to 300° C., and injection molded at a mold temperature of 90° C to obtain a test piece for use in the determination of heat deformation temperature. The heat deformation temperature of the test piece was determined in accordance with ASTM D-648, and was found to be 119° C.

Further, substantially the same procedure as described above was repeated to obtain a test piece having a thickness of ⅛ inch for use in an Izod impact test. The Izod impact test was conducted at 23° C. using the test piece in accordance with ASTM D-256, and the Izod impact strength was found to be 42 kg·cm/cm.

Still further, in accordance with the Bergen ¼ ellipse method (see SEP Journal, 667, 1962), a salad oil was applied to the surface of the test piece for use in the Izod test impact test, and then, the strain at the time when crack occurred was determined at 80° C. As a result, the critical strain was found to be 0.5%.

INDUSTRIAL APPLICABILITY

Figure 1:
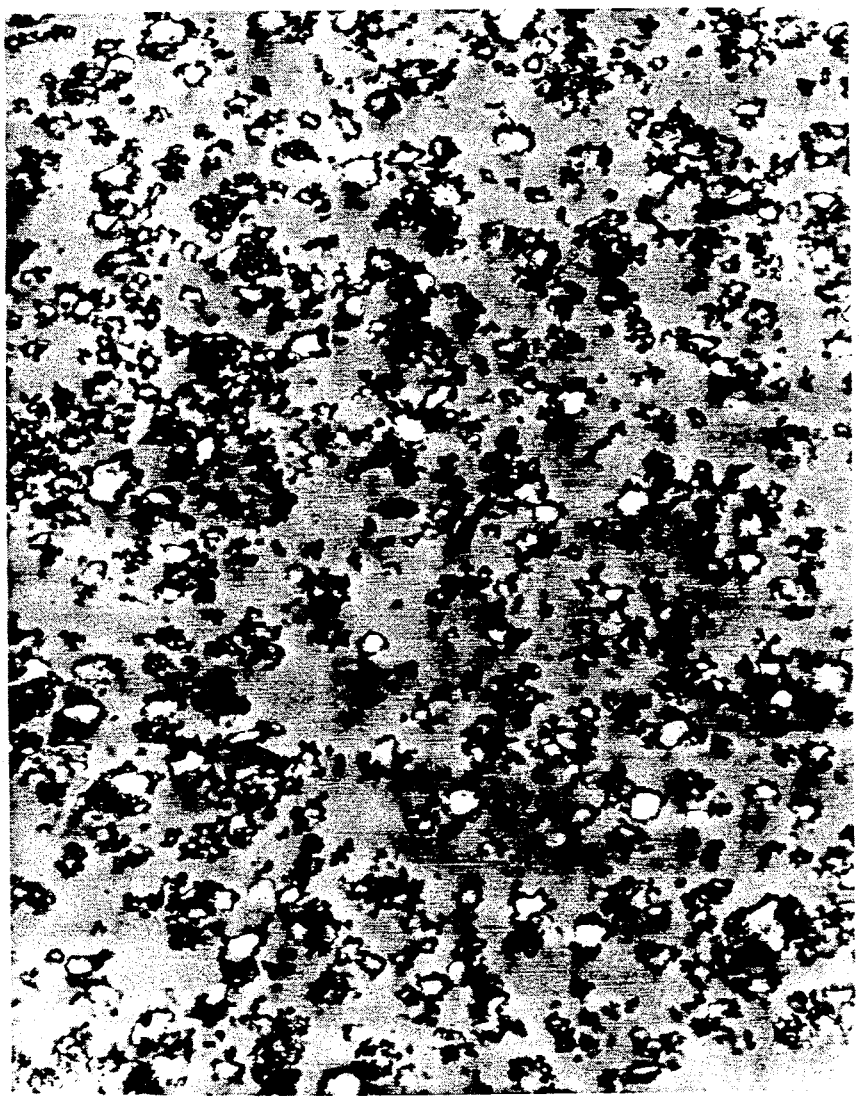
FIG. 1 is an electron photomicrograph showing the morphology of dispersion of the shaped resin article of the present invention as obtained in Example 1.
Figure 2:
FIG. 2 is an electron photomicrograph showing the morphology of dispersion of the shaped resin article of the present invention as obtained in Example 5.

The shaped resin article of the present invention has not only remarkably improved weld-line toughness and delamination resistance but also excellent resistance to heat, impact and chemicals. Therefore, the shaped resin article of the present invention is useful as various parts. Representative examples of such parts include automobile parts, e.g., exterior parts such as bumpers, fenders, door panels, various moles, emblems, engine hoods, wheel caps, roofs and spoilers, and interior parts such as instrument panels, console boxes and trims. Further, the shaped resin article of the present invention can also suitably be used as interior and exterior parts of electrical appliances. Representative examples of such exterior and interior parts include cabinets for office automation machines, television sets, video units, TV game sets and various disc players, and parts of refrigerators and the like.

We claim:
1. A shaped resin article consisting essentially of:
  (1) a continuous phase of a polyphenylene ether and
  (2) a dispersed phase dispersed in said continuous phase (1) and consisting essentially of:
    ($\alpha$) a particulate dispersed polyolefin phase which is comprised of a polyolefin and has a minor diameter of not greater than 0.5 $\mu$m, the outer surface of said dispersed polyolefin phase ($\alpha$) having, cohered thereto, particles of at least one block copolymer selected from the group consisting of a block copolymer of a vinyl aromatic compound and a conjugated diene compound, and a hydrogenation product thereof, and
    ($\beta$) a particulate dispersed copolymer phase having a minor diameter of not greater than 0.3 $\mu$m, which is comprised of said at least one block copolymer and is dispersed in said continuous phase (1) and not cohered to said dispersed polyolefin phase ($\alpha$),
  said at least one block copolymer having a Young's modulus of at least 1,500 Kg/cm²,
  wherein the weight proportions of said polyphenylene ether, said polyolefin and said at least one block copolymer are respectively from 50 to 95%, from 5 to 15% and from 10 to 35% relative to the total weight of said polyphenylene ether, said polyolefin and said at least one block copolymer.
2. The article according to claim 1, wherein said particulate dispersed copolymer phase ($\beta$) has a minor diameter of not greater than 0.1 $\mu$.
3. The article according to claim 1, wherein said polyolefin is a low density polyethylene or a high density polyethylene.
4. The article according to claim 3, wherein said polyolefin is a linear low density polyethylene.
5. The article according to claim 1, which is a compression-molded article, an injection-molded article, an extrusion-molded article, a blow-molded article or an inflation-molded article.
6. The article according to claim 1, which is a pellet.

* * * * *